UNITED STATES PATENT OFFICE.

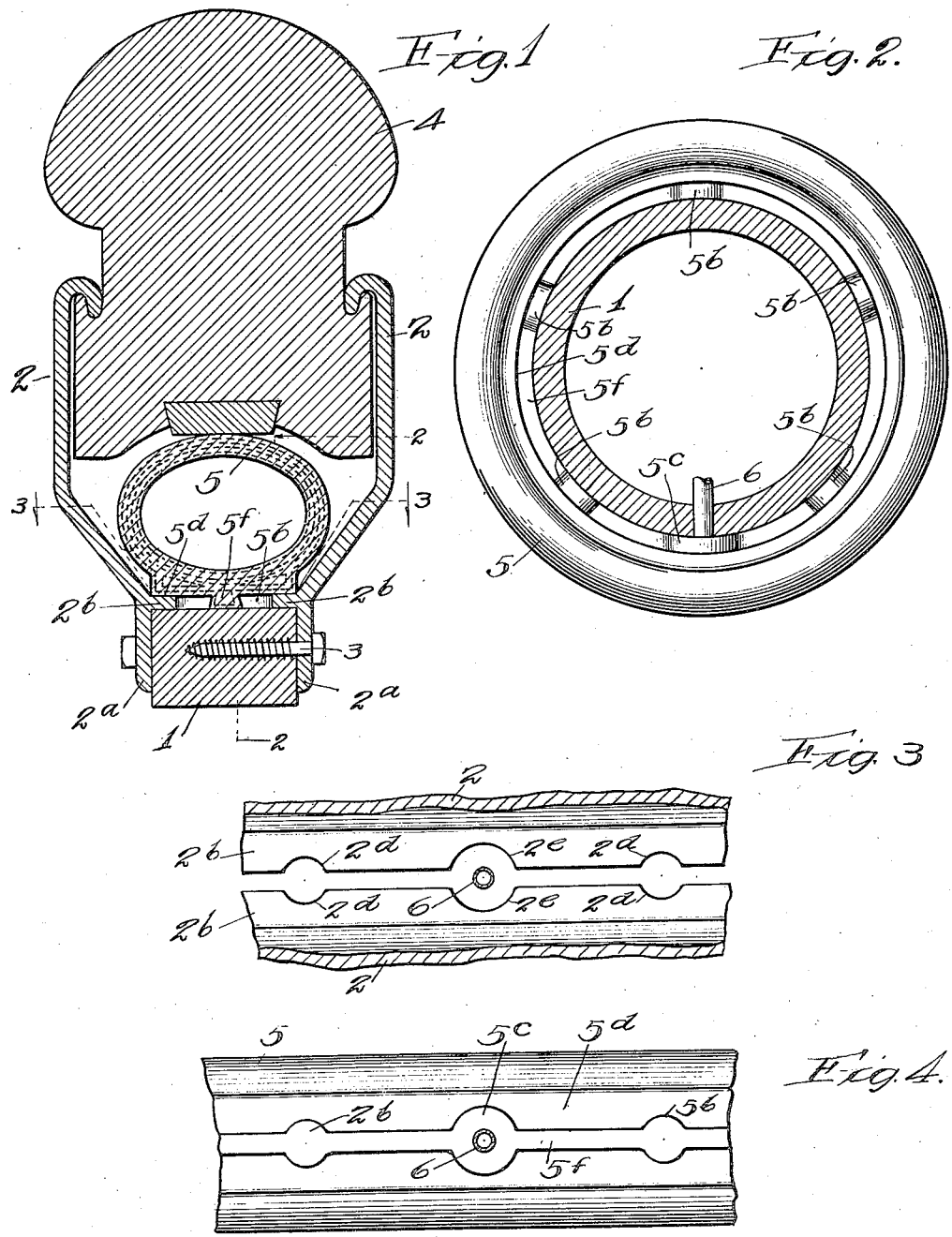

MELVILLE CLARK, OF CHICAGO, ILLINOIS.

VEHICLE WHEEL-TIRE.

1,130,146.  Specification of Letters Patent.  Patented Mar. 2, 1915.

Application filed March 22, 1913. Serial No. 756,073.

*To all whom it may concern:*

Be it known that I, MELVILLE CLARK, a citizen of the United States, residing at Chicago, in the county of Cook and State of Illinois, have invented new and useful Improvements in Vehicle Wheel-Tires, of which the following is a specification, reference being had to the accompanying drawings, forming a part thereof.

The purpose of this invention is to provide an improved vehicle wheel having a cushion tread and an air cushion upon which said cushion tread seats.

It consists in the elements and features of construction shown and described as indicated in the claims.

In the drawings:—Figure 1 is a section radial with respect to the wheel through the felly and tire of a wheel embodying this invention. Fig. 2 is a section at the line 2—2 on Fig. 1 around the whole circumference of the tire and felly on a smaller scale than Fig. 1. Fig. 3 is an edge view of the wheel with the tread member and pneumatic cushion removed, flanges being cut in section circumferentially with respect to the wheel, as at the line 3—3 on Fig. 1. Fig. 4 is an inner circumferential edge elevation of a piece of the air tube.

In the structure shown in the drawings, 1 represents the customary wood felly of a vehicle wheel.

2, 2 are lateral guards clamped on to the felly having angle flanges, $2^a$, $2^b$, for embracing the opposite outer circumferential corners of the felly, the flanges, $2^a$, at the sides serving for clamping the guards on to the felly by means of the bolts, 3, and the flanges, $2^b$, circumferentially encompassing the felly, forming the seat of the air tube, as hereinafter explained.

4 is the tread member embraced between the guards, 2, 2, and projecting from between them to serve as the tread.

5 is a pneumatic spring which is lodged in the chamber bounded circumferentially by the tread member, 4, the flange-encompassed felly, 1, and the lateral guards, 2, 2. The pneumatic spring, 5, is designed to be constructed of rubber-saturated fabric or rubber having fabric embedded in it so as to be substantially non-stretchable but elastically flexible, so as to be adapted to be inflated to substantially or approximately circular form in cross section, becoming oval under the pressure of the load. This form of inner tube is to be distinguished from the usual elastically flexible and stretchable tube which is designed, when inflated, to fill the chamber within which it is restrained; that is, to be expanded to the side walls of such chambers as to the inner and outer circumferences thereof. When such an expansible air tube is employed and inflated to fill its chamber as described, there is formed merely an air cushion which is compressed more or less by the load and reacts against such compression to afford the desired spring effect. I use the term "air spring" to distinguish from such an air cushion, and I regard the distinction as of importance, because although in both cases it is the reaction of the air from compression that affords the resiliency, there is very marked advantage in the air spring which in its change of form due to compression at the point where the weight of the load is experienced, is compelled to change its form more or less throughout the entire circumference of the wheel, and does so without being pressed against the side walls of its chamber.

The characteristic which distinguishes the tire shown in the drawings is that at the inner circumference it is transversely flat; that is to say, has a cylindrical surface forming a broad base or footing for seating upon the cylindrical surface of the flanges, $2^b$, which encompass the felly. By reason of this form, when the tube is inserted in place between the guards, 2, 2, it tends to assume what may be called an erect position; that is to say, a position at which its medial plane is directly transverse to the wheel axis, and it is not liable to lean to one side or to be distorted leaning toward one side at parts of the circumference of the wheel and to the other side at other parts of the circumference of the wheel, as is liable to be the case with the common form of inner tube which is without such broad base or footing at its inner circumference. This insures that when the tube is inflated and the tire is under load, the pressures and strains experienced by the inner tube operate without any tendency to wrench or twist it and without forcing it into frictional contact with the guards at either side at any part of its circumference. This result is further assisted and the tube is prevented from creeping by bosses, $5^b$, which project from the said flat inner circumference or base, $5^d$, at intervals in the circumference of the wheel, six such bosses, including one larger than the others and denoted 5ᶜ, being shown distributed somewhat unequally about the circumference and engaged with notches, 2ᵈ and 2ᵉ, in the facing edges of the flanges, 2ᵇ, of the guards, 2, the larger notch, 2ᵉ, being provided to accommodate the larger boss 5ᶜ. The larger boss, 5ᶜ, is designed to be apertured to receive the inflation tube, 6, and the two bosses nearest it are located at less distance from said boss, 5ᶜ, than the distances apart of the remainder of the bosses, thus reinforcing the engagement of the boss, 5ᶜ, through which the inflating tube extends, it being most important that the inner tube, 5, shall not be dragged away from its proper position on the felly at the point at which this inflation tube is situated. It is of advantage to provide at the middle of the width of the base, 5ᵈ, a rib, 5ᶠ, connecting the bosses, and that they extend completely around the inner circumference of the tube, said rib being thus adapted to be engaged between the facing edges of the flanges, 2ᵇ, and further reinforcing the engagement of the flanges with the tubes and insuring the correct position of the tube at its broad base seating on the flanges.

I claim:—

1. In a vehicle wheel, in combination with the felly, the tread member and lateral guards clamped on to the felly and embracing the tread member so as to form an annular chamber between said felly, tread member and guards, a pneumatic spring in such chamber consisting of an endless tube substantially unstretchable transversely, said tube being less in diameter than the width of the chamber between the guards and being at its inner circumference normally cylindrical so as to present a base for seating on the inner wall of the chamber which is normally flat transversely and nearly as wide as the diameter of the tube, the guards having their flanges which encompass the felly similarly cylindrical to afford a transversely flat seat for the air spring.

2. In a vehicle wheel, in combination with the felly, the tread member and lateral guards clamped on to the felly and embracing the tread member so as to form an annular chamber between said felly, tread member and guards, a pneumatic spring in such chamber consisting of an endless tube substantially unstretchable transversely, said tube being less in diameter than the width of the chamber between the guards and being at its inner circumference cylindrical so as to present a base for seating on the inner wall of the chamber which is flat transversely and nearly as wide as the diameter of the tube, and having at the middle of the width of such flat base a rib extending circumferentially with respect to the wheel and bosses distributed along said rib at intervals in the circumference of the wheel, the guards having their flanges which encompass the felly and form the inner wall of the chamber for the air spring similarly cylindrical to afford a transversely flat seat for said air spring, and spaced apart at the middle of the width of the felly to receive said rib of the air spring, and provided with notches in their opposed edges which face each other and form recesses for receiving said bosses of the air spring.

In testimony whereof, I have hereunto set my hand at Chicago, Illinois, this 19th day of March, 1913.

MELVILLE CLARK.

Witnesses:
M. GERTRUDE ADY,
LUCY I. STONE.